United States Patent [19]
Gentile

[11] 3,945,755
[45] Mar. 23, 1976

[54] TORQUE TRANSMITTING APPARATUS

[76] Inventor: Scipio S. Gentile, P.O. Box 1375, Inverness, Fla. 32650

[22] Filed: July 1, 1974

[21] Appl. No.: 484,369

[52] U.S. Cl. .................................. 415/5; 416/7
[51] Int. Cl.² .................................. F01D 23/00
[58] Field of Search .......... 74/216.5, DIG. 9; 416/7; 415/5, DIG. 2, 4; 60/39.35; 137/355.16

[56] References Cited
UNITED STATES PATENTS

| | | | |
|---|---|---|---|
| 920,361 | 5/1909 | Merriam | 415/5 |
| 1,058,776 | 4/1913 | Mickel | 415/5 |
| 1,481,397 | 1/1924 | Tetetleni | 415/4 |
| 1,483,505 | 2/1924 | Bradshaw | 415/5 |
| 2,104,984 | 1/1938 | Grondahl | 415/5 |

FOREIGN PATENTS OR APPLICATIONS

| | | | |
|---|---|---|---|
| 741,183 | 2/1933 | France | 415/DIG. 2 |

Primary Examiner—Samuel Scott
Assistant Examiner—A. Russell Burke
Attorney, Agent, or Firm—Bernard L. Kleinke; Thomas W. Speckman; Leonard J. Kalinowski

[57] ABSTRACT

An apparatus for transmitting torque to a load includes a pair of pulleys vertically spaced apart by a great distance for movably mounting a long endless belt in a substantially vertical disposition to move it freely in a closed loop path, a plurality of spaced-apart arm devices connected to and extending from the belt, and a plurality of weights adapted to be carried by the arm devices. The weights and the arm devices are arranged in pairs, and each one of the pairs provides a larger moment acting through the belt on at least one of the pulleys when falling vertically downwardly under the force of gravity and alternately provides a relatively smaller opposing moment acting through the belt on at least one of the pulleys when being pulled vertically upwardly by the belt, whereby torque may be transmitted from at least one of the pulleys for driving the load.

7 Claims, 6 Drawing Figures

TORQUE TRANSMITTING APPARATUS

The present invention relates to a torque transmitting apparatus, and it more particularly relates to an apparatus for transmitting torque to a load, which may be used for the production of power, such as a generator for producing electrical power.

Many techniques have been employed for producing electrical power, such techniques including hydroelectric power generated by falling water. In the latter technique, turbines are driven by water falling under the force of gravity to in turn drive an electrical generator for producing electrical power. Another technique which is becoming more popular as a result of the current energy shortage, is a windmill which is operated by the wind acting on oblique vanes or sails which radiate from a horizontal shaft to in turn drive an electrical generator for the production of electrical power. While such techniques have been satisfactory for some applications, it would be highly desirable to have a new and improved torque transmitting apparatus for driving a load, such as an electrical generator, for the production of electrical power. Such apparatus should greatly facilitate the transmission of torque for the driving of such loads.

Therefore, the principal object of the present invention is to provide a new and improved torque transmitting apparatus, which is more efficient and economical, and which greatly facilitates the transmitting of torque to a load, such as an electrical generator for the production of electrical power.

Briefly, the above and further objects are realized in accordance with the present invention by providing a torque transmitting apparatus including a pair of pulleys vertically spaced apart by a great distance for movably mounting a long endless belt in a substantially vertical disposition to move it freely in a closed loop path, a plurality of spaced-apart arm devices connected to and extending from the belt and movable along the path alternatingly vertically upwardly and vertically downwardly, and a plurality of weights adapted to be carried by the arm devices. The weights and the arm devices are arranged in pairs, and each one of the pairs of weights and arm devices provide a larger moment acting through the belt on at least one of the pulleys when falling vertically downwardly under the force of gravity and alternately provides a relatively smaller opposing moment acting through the belt on at least one of the pulleys when being pulled vertically upwardly by the belt. Torque may be transmitted from at least one of the pulleys for driving a load, such as an electrical generator. In one form of the invention, the difference in the moments acting on the belt is produced by having a heavier weight falling downward than the weight being pulled upwardly by the belt. In another disclosed form of the present invention, the difference in the moments is provided by having equal weights carried by each one of the arm devices, but the distance between the weight and the belt is substantially greater when the weight falls downwardly and is substantially shorter when being pulled vertically upwardly by the belt.

The above-mentioned and other objects and features of this invention and the manner of attaining them will become apparent, and the invention itself will be best understood, by reference to the following description of an embodiment of the invention taken in conjunction with the accompanying drawings, wherein.

Figures 4, 5:
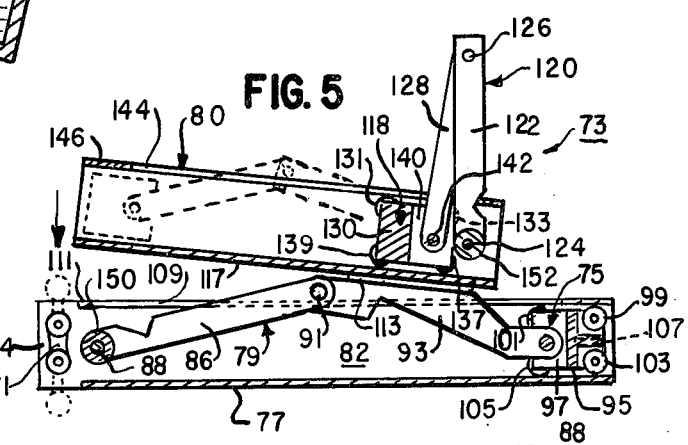
FIG. 4 is a schematic diagram of another torque transmitting apparatus, which is constructed in accordance with the present invention.
Figure 6:
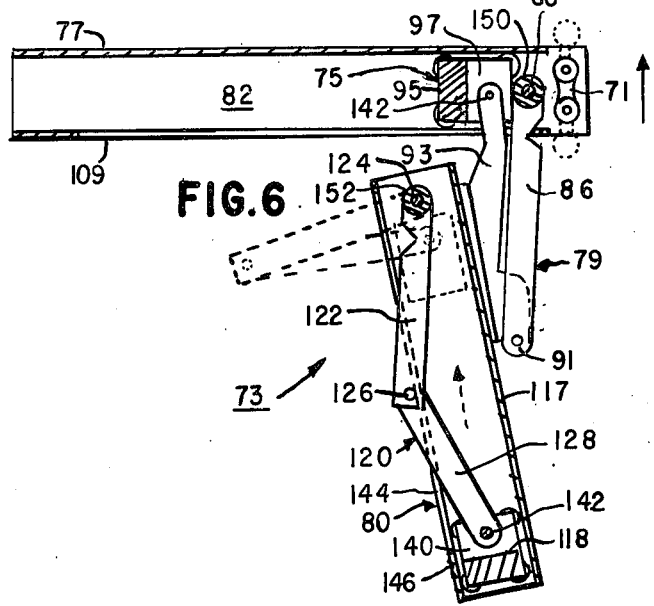

FIG. 5 is a vertical cross-sectional view of one of the arm devices and its associated weight, illustrating the weight disposed in an outer position away from the chain as the weight falls downwardly; and FIG. 6 is a cross-sectional view of the arm device and its weight of FIG. 5 illustrating the weight in its inner retracted position adjacent the belt as it pulls the arm device and its weight vertically upwardly.

Figure 1:
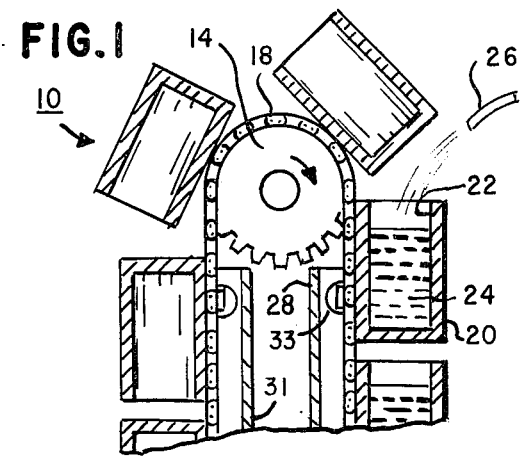
FIG. 1 is a cross-sectional vertical view, partly schematic, of a torque transmitting apparatus, which is constructed in accordance with the present invention.
Figure 2:
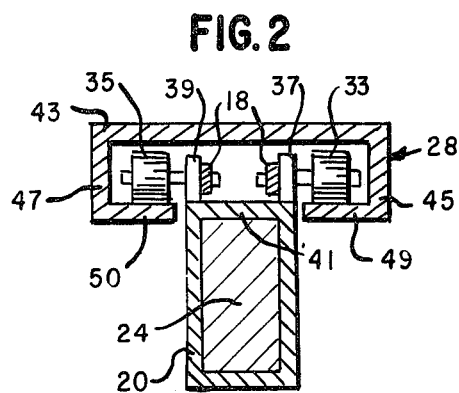
FIG. 2 is a cross-sectional view of a pair of rollers and a guide for one of the containers of the apparatus of FIG. 1.
Figure 3:
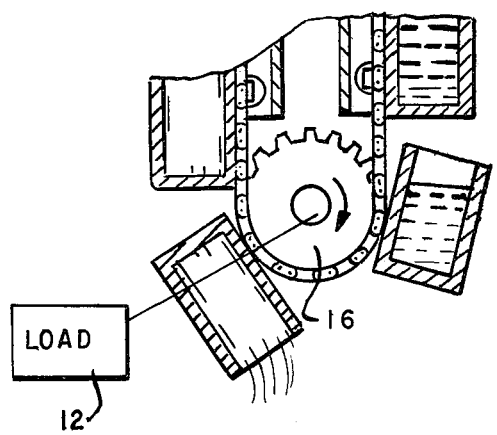
FIG. 3 is a fragmentary cross-sectional view of a pair of modified containers for the apparatus of FIG. 1 for preventing tilting of the containers.

Referring now to the drawings, and more particularly to FIGS. 1, 2 and 3 thereof, there is shown a torque transmitting apparatus 10 for conveying torque to a load 12, such as an electrical generator, which apparatus is constructed in accordance with the present invention. The apparatus 10 generally comprises a pair of pulleys in the form of a rotatably mounted upper sprocket 14 and a rotatably mounted lower sprocket 16 vertically spaced apart by a great distance for movably mounting a belt in the form of a chain 18 in a substantially vertical disposition to move it freely in a closed loop path, a plurality of spacedapart arm devices, such as the open-top container 20, connected to and extending from the chain 18 with their open mouths, such as the open mouth 22 of the container 20 facing upwardly, and a plurality of weights, such as the quantity of water 24 disposed within the container 20, adapted to be carried by the containers. The containers move along the closed loop path of travel of the chain 18 alternately vertically upwardly and vertically downwardly. A nozzle 26 disposed at an upper elevation near the upper sprocket 14 sprays water into the containers as they move therepast so that the containers and their contents fall under the force of gravity to pull the chain 18 downwardly. Once the containers move at the bottom portion of the path of travel of the chain 18 at the lower sprocket 16, the containers commence to be pulled vertically upwardly by the chain 18 and thus the containers are positioned upside down to permit the contents to fall therefrom under the force of gravity to a container (not shown). Thereafter, the empty containers are pulled vertically in their inverted dispositions until they begin to fall downwardly and are filled with water by the nozzle 26 to repeat the cycle of operation. The water in the containers as they fall through a great distance, which may be 125 feet or more, provide a large moment acting through the chain 18 on the sprocket 14 when falling vertically downwardly under the force of gravity. Alternately, when the empty containers are pulled vertically upwardly by the chain 18, a relatively smaller opposing moment acts through the chain 18 on the upper sprocket 14 so as to provide a highly efficient apparatus for transmitting torque to the load 12. Such an apparatus may be employed for various different applications such as in connection with use on board ship or other applications where large bodies of water are available, such as in connection with a water fall. Also, in applications where the load 12 is an electrical generator, the generator can be used to develop electrical power for driving a pump which in turn moves the water disposed in the container (not shown) at the lower elevation upwardly to a container (not shown) at the upper elevation for supplying the water to the nozzle 26. In this regard, both of the ratchets 14 and 16 may be connected to one of more generators or motors for facilitating the operation.

Considering now the apparatus 10 in greater detail with reference to FIGS. 1 and 2 of the drawings, a pair of vertically-disposed spacedapart guides 28 and 31 mounted vertically on a supporting structure (not shown) adjacent the vertically-extending portions of the chain 18 to receive and guide a pair of rollers, such as the rollers 33 and 35 of the container 20 to prevent the containers from swinging inwardly as they move upwardly and downwardly so that the chain 18 is not impeded in its motion. The guides 28 and 31 extend from a position immediately below the upper sprocket 14 to a position immediately above the upper sprocket 16 and if desired, may include members (not shown) for guiding the rollers on the containers into the guides as the chain carrying the containers moves from the sprockets to a position for enabling the rollers to enter the guides.

The containers, such as the container 20, are rectangular in cross section as shown in FIG. 2, but it is to be understood that the containers may assume other shapes as well as may become apparent to those skilled in the art. A pair of parallel spaced-apart inwardlyextending flanges 37 and 39 are fixed by any suitable means, such as welding, to the inner vertical end wall 41 of the container 20 and are fixed to the chain 18 disposed therebetween, it being understood that the container 20 is similar in construction to each one of the other containers and each one of the containers being equally spaced apart along the chain 18. The guides, such as the guide 28, is generally C-shaped and includes a web portion 43 having a pair of leg portions 45 and 47 extending at right angles thereto, the respective leg portions terminating in inwardly bent spaced-apart end portions 49 and 50 extending at right angles to the legs 45 and 47 and parallel to the portion 43 for receiving the end wall 41 of the container 20 freely therebetween as shown in FIG. 2. The rollers 33 and 35 are journaled for rotation on the members 37 and 39 extending outwardly therefrom. The rollers 33 and 35 are rollingly supported between the respective terminating end portions 49 and 50 and the web portion 43 as the rollers 33 and 35 move downwardly through the guide 28.

Referring now to FIG. 3, there is shown another technique for preventing the containers from swinging inwardly as they move upwardly or downwardly. Each one of the containers, such as the containers 52 and 54, for the apparatus 10 may include a downwardly depending lug or tab such as the lug 56 extending from the bottom wall 58 of the container 52. The lug 56 extends into the open mouth 60 of the container 54 adjacent its inner end wall 62 to limit its tilting motion so that the bottom end portion (not shown) of the container 54 is prevented from swinging inwardly under the force of gravity, whereby the chain supporting the containers 52 and 54 moves without being impeded by swinging motion of the containers attached thereto. It is to be understood that the technique shown in FIG. 3 may be used in addition to or in lieu of the guide and rollers shown in FIGS. 1 and 2.

Referring now to FIGS. 4, 5 and 6 of the drawings, there is shown a torque transmitting apparatus 64, which is constructed in accordance with the present invention, and which is similar in construction to the apparatus 10 except that there are equal amounts of weight being carried upwardly and downwardly with automatically adjustable distances between the weights and the chain. The apparatus 64 generally comprises a pair of pulleys in the form of a pair of upper and lower sprockets 66 and 68 spaced apart by a great distance for movably mounting a belt in the form of a chain 71 in a substantially vertical disposition to move it freely in a closed loop path in a manner similar to the chain 18 and the sprockets 14 and 16 of FIG. 1, a plurality of spaced-apart arm devices, such as the arm device 73, connected to and extending from the belt or chain 71 and movable along the path alternatingly vertically upwardly and vertically downwardly, and a plurality of weights, such as the weight 75, carried by the arm devices, such as the device 75. The weights and the devices being arranged in pairs, and each one of the pairs of weights and arm devices provide a larger moment acting through the belt or chain 71 on the upper stroke 66 when falling vertically downwardly under the force of gravity and alternately provides a relatively smaller opposing moment acting through the chain 71 on the upper sprocket 66 when the chain 71 pulls the devices vertically upwardly. The difference in the moments depending upon the direction of movement of the weights is achieved in the apparatus 64 by adjusting automatically the position of the weights relative to the chain 71. In this regard, when the weights are moving in a downward direction, such as the weight 75 in FIG. 4, the weights are disposed at an outer position at a distance from the belt or chain 71. When the weights are moving in an upward direction as carried by the belt or chain 71, the weights are disposed at an inner position closely adjacent to and a short distance from the chain 71. Therefore, as the weights carried by the arm devices move through a circuitous path traveled by the chain 71, the outer weights falling under the force of gravity exert a substantially and relatively greater moment on the upper ratchet 66 as compared to the opposing moment exerted on the ratchet 66 by the upwardly-moving weights pulled vertically upwardly by the chain 71. As in the apparatus 10 of FIG. 1, the apparatus 64 functions with greater efficiency when the vertical distance between the sprockets 66 and 68 is a very substantial distance, in the order of 125 feet or more, to enable the weights to fall through as great a distance as possible within the physical limitations of the structure. As a result, as in the apparatus 10 of FIG. 1, the apparatus 64 of FIG. 4 may have load devices, such as the load device 76 driven by the shaft of the lower sprocket 68, which receive torque from the apparatus 64. For example, the load device 76 may be in the form of an electrical generator for the production of electrical power. As indicated at 77, 78 and 79, other devices, such as motors and/or generators may be connected to the shafts of sprockets 66 and 68 for maximum utilization and efficiency of the apparatus 64. The apparatus 64 functions in a similar manner as the apparatus 10 of FIG. 1, the only difference being in the form of the arm devices and the weights carried thereby. Therefore, the techniques employed for preventing bending moments on the arm devices from interfering with the free movement of the chain as shown in FIGS. 1, 2 and 3 of the drawings may also be employed in the apparatus 64 of FIG. 4. The apparatus 64 of FIG. 4 may also be employed in connection with windmill apparatus by mounting vanes (not shown) extending from the shaft of the upper sprocket 66. As a result of the differences in the moments exerted on the chain 71 depending upon the direction of movement of the weights, a highly efficient and economical apparatus is provided for transmitting torques to load devices.

Considering now the arm devices, such as the device 73, in greater detail with reference to FIGS. 5 and 6 of the drawings, each one of the arm devices is similar to each one of the other arm devices of the apparatus 64 and therefore only the arm device 73 will be described. The arm device 73 generally comprises an elongated track 77 for receiving and guiding the weight 75 between an outer position as shown in FIG. 5 and an inner retracted position in much closer proximity to the chain 75 as shown in FIG. 6, a 77 79 interconnecting the weight 75 with the track 66 to cause the weight 75 to move between the inner and the outer positions, and a gravity actuated mechanism 80 for causing the linkage 79 to move the weight 75 when the arm device 73 changes its direction of movement from either an upwardly moving direction to a downwardly moving direction or from a downwardly moving direction to an upwardly moving direction.

The track 77 is generally tubular in shape and approximately square in cross section throughout its length with open ends. The rear wall 82 has an integral flange portion 84 to which is fastened the chain 71 to fix it in place. The linkage 79 includes an arm 86 pivotally connected at one of its ends at 88 near the end flange 84, the opposite end of the arm 86 being pivotally connected by means of a pin 91 to one end of an arm 93 of the linkage 79. The weight 75 includes a relatively heavy rectangular-shaped block 95, which has a slot 97 for receiving the opposite end portion of the arm 93 for pivotally connecting it to the block 95. In order to facilitate movement of the block 95 within the track 77, the block 95 is somewhat smaller in cross section than the cross section of the track 77, and the block 95 is rollably supported within the track 77 by a set of four rollers or wheels, such as the wheels 99 and 101 at the upper portion of the block as shown in FIG. 5, a set of correspondingly similar rollers or wheels, such as the wheels 103 and 105 rotatably mounted at the bottom portion of the block 95 as shown in FIG. 5. A pair of rollers or wheels, such as the wheel 107, rollably support the block 95 at the opposite sides thereof, the wheel 107 supporting the back side of the block 95 on the wall 82.

A slot 109 extending through the upper wall 111 of the track 77 permits the linkage 79 to extend upwardly therethrough as shown in FIG. 5. In the outer position of the weight 75, the pin 91 engages the top wall 111 to limit the movement of the linkage 79 into the interior of the track 77. A transverse plate 113 is fixed to the arm 93 and carries the gravity-actuated mechanism 80 which is fixed to the plate 113 by any suitable technique, such as welding or brazing.

The gravity-actuated mechanism 80 generally comprises an elongated track 117 fixed to the plate 113, the track 117 being similar to the track 77 but shorter in length. A weight 118 similar to the weight 75 is rollably mounted within the track 117 and includes a linkage 120 interconnecting the weight 118 and the track 117.

The linkage 120 includes an arm 122 pivotally connected at 124 near the outer end of the track 117, the opposite end of the arm 122 being pivotally connected at 126 to an arm 128 of the linkage 120. The weight 118 includes a block 130 rollably supported within the track 117 in a similar manner as the block 95 in the track 77 by means of a set of four upper rollers or wheels, such as the wheels 131 and 133 as shown in FIG. 5, and a set of four lower rollers or wheels, such as the wheels 137 and 139 as shown in FIG. 5. The block 130 includes a slot 140 for receiving the opposite end portion of the arm 128, which is pivotally connected at 142 within the slot 140. The linkage 120 extends through a slot 144 in the upper wall 146 of the track 117 to enable the weight 118 to move inwardly to the position as shown in broken lines in the direction of the bottom arrow. The weight 118 is moved to the inner position in close proximity to the chain 71 during the upward movement of the device 73 as indicated in solid lines in FIG. 6. The pin connection 126 of the linkage 120 as shown in FIG. 6 rests on the wall 146 of the track 117 to limit the inward motion of the linkage 120 when the weight 118 is disposed in the position as shown in FIG. 6 closely adjacent the chain 71. As shown in FIG. 6, a sleeve 150 surrounding the pivot point 88 serves as a stop for the block 95 when it is in its retracted inner position. Similarly, as shown in FIG. 5, a sleeve 152 surrounding the pivot point 124 for the arm 122 serves as a stop for the block 130 when it is disposed in its outermost position.

Considering now the operation of the arm device 73, assume that the device 73 is in its downwardly-moving position with the weight 175 in its outermost extended position as shown in FIG. 5, the arm 73 falls under the force of gravity, thereby pulling the chain 71 and exerting a moment on the upper ratchet 66 in the direction of its rotation. The device 73 continues to fall downwardly and is disposed generally in a horizontal direction as indicated in FIGS. 4 and 5 of the drawings, until the device 73 falls to a point where it is disposed opposite the lower sprocket 68 where it then changes its direction and follows the chain 71 around the bottom portion of the sprocket 68. The relative position of all of the parts of the device 73 remain as shown in FIG. 5 until and including a vertical position where the axis of the arm device 73 is disposed in alignment with the longitudinal axis of the chain 71.

Thereafter, once the arm device 73 commences an upward movement upon being pulled upwardly by the chain 71, the gravity-actuated mechanism 80 commences its operation since the entire mechanism 80 serves to apply a force on the arm 93 to pivot it in a clockwise direction as viewed in FIG. 5 to move the weight 75 toward theh pivot point 88 and thus back the linkage 79 out of the track 77. The weight 75 continues to move toward the pivot point 88 as the device 73 continues to move upwardly toward a horizontal disposition. However, before the device 73 assumes its horizontal position on the left hand side of the apparatus 64 as shown in FIG. 4, the track 117 assumes a horizontal disposition and then its inner end portion becomes slightly lower than its outer end portion to cause the weight 118 to fall under the force of gravity and roll within the track 117 until it reaches a position as indicated by the broken lines in FIG. 5. The latter inward motion of the weight 118 occurs very rapidly at this point, and once the weight 130 is disposed closely adjacent to the chain 71, there is a greater leverage or moment exerted by the mechanism 80 on the arm 93 to complete the movement of the weight 75 against the sleeve 150 as shown in FIG. 6. The track 77 is then disposed in a generally horizontal position and moves in an upward direction, the mechanism 80 as shown in FIG. 6 being generally disposed in a substantially vertical position with the weight 118 below the weight 75 so that both weights 75 and 118 are disposed in relatively close proximity to the chain 71 as compared to the position of the same weights as shown in FIG. 5 during the downward motion of the device 73.

The device 73 continues to be pulled upwardly in a vertical direction by the chain 71 until it is moved opposite the upper sprocket 66, whereupon the device 73 follows the chain 71 around the sprocket 66 until the track 77 extends in a vertical direction in alignment with the longitudinal axis of the chain 71. In such a vertical orientation of the track 77 at the top of the apparatus 64, the relative positions of the parts of the device 73 are as illustrated in FIG. 6.

When the device 73 commences to follow the chain 71 and fall downwardly, the track 117 of the mechanism 80 assumes a horizontal disposition shortly after the track 77 commences its downward movement. Once the track 117 assumes a position where its end portion which is connected to the linkage 79 is lower than the weight 118, the weight 118 quickly falls under the force of gravity within the track 117 to its opposite end portion against the sleeve 152 as indicated by the broken lines in FIG. 6. In the broken line position of FIG. 6, the weight 118 as well as the entire mechanism 80 commences to exert a force on the arm 86 of the linkage 97 to produce a clockwise moment about the pivot point 88 as viewed in FIG. 6. As the track 77 continues to move downwardly toward a horizontal disposition, the weight 118 as well as the mass of the mechanism 80 continue to cause the arm 86 to pivot about the point 88, whereby the weight 75 is moved within the track 77 until the pin 91 of the linkage 79 engages the wall 111 of the track 77 as shown in solid lines in FIG. 5. Thereafter, the device 73 commences to remain in its horizontal position and it falls under the force of gravity. The operation may then be repeated.

It should be noted that the position of the track 117 relative to the position of the track 77 as shown in FIG. 5 is important, and the track 117 is disposed at an angle relative to the horizontal track 77 with the inner end of the track 117 being inclined upwardly relative to the lower end of the track 117 containing the weight 118. Similarly, the relative position of the tracks as shown in FIG. 6 during the upward movement of the device 73 is also important as indicated in the foregoing description since the rapid movement of the weight 118 is important to complete the movement of the weight 77 in both operations at the upper and the lower ends of the chain 71. The rapid movement of the weight 118 creates an impact and provides momentum to carry the weight 75 the remaining portion of its travel.

What is claimed is:

1. In an apparatus for transmitting torque to a load, the improvement comprising;
   a long endless belt;
   a pair of pulley means vertically spaced apart by a great distance for movably mounting said belt in a substantially vertical disposition to move it freely in a closed loop path;
   a plurality of spaced apart arm devices connected to and extending from said belt and movable along said path alternatingly vertically upwardly and vertically downwardly;
   a plurality of weights adapted to be carried by said arm devices, each one of said arm devices having one of said weights mounted thereon movable between an outer position away from said belt when falling vertically downwardly and an inner position near said belt when moving vertically upwardly, said weights and said arm devices being arranged in pairs, each one of the pairs of weights and arm devices providing a larger moment acting through said belt on at least one of said pulley means when falling vertically downwardly under the force of gravity and alternately providing a relatively smaller opposing moment when acting through said belt on at least one of said pulley means when being pulled vertically upwardly by said belt;
   means coupled to at least one of said pulleys for connecting it drivingly to the load; and
   gravity-actuated means for moving said weights to their inner positions as they commence moving upwardly and for moving said weights to their outer positions as they commence falling downwardly.

2. An apparatus according to claim 1, further including a plurality of rollers journaled for rotation on said arm devices, a pair of vertically extending guides adapted to receive rollably said rollers as said arm devices move vertically upwardly and downwardly.

3. An apparatus according to claim 2, wherein said belt comprises a chain, said pair of pulley means being sprockets.

4. An apparatus according to claim 1, wherein each one of said arm devices includes an elongated track for receiving and guiding its weight.

5. An apparatus according to claim 4, wherein each one of said arm devices including a linkage interconnecting its weight with its track to cause its weight to move between said inner and said outer positions, said gravity-actuated means including a second weight for causing its linkage to move its weight in response to a change of the direction of movement of its arm device.

6. An apparatus according to claim 5, wherein said gravityactuated means includes a second track for receiving and guiding movement of its second weight between a second inner position and a second outer position.

7. An apparatus according to claim 6, wherein said gravityactuated means includes a second linkage interconnecting its second weight with its track to cause its second weight to move between its second inner position and its second outer position.

* * * * *